United States Patent
Barton

(10) Patent No.: US 10,097,885 B2
(45) Date of Patent: *Oct. 9, 2018

(54) PERSONAL CONTENT DISTRIBUTION NETWORK

(71) Applicant: TiVo Solutions Inc., San Carlos, CA (US)

(72) Inventor: James Barton, Alviso, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,503

(22) Filed: Jun. 26, 2015

(65) Prior Publication Data

US 2015/0296256 A1 Oct. 15, 2015

Related U.S. Application Data

(63) Continuation of application No. 11/519,717, filed on Sep. 11, 2006, now Pat. No. 9,100,702.

(51) Int. Cl.
*H04N 21/21* (2011.01)
*H04N 21/4402* (2011.01)
(Continued)

(52) U.S. Cl.
CPC ....... *H04N 21/440218* (2013.01); *H04N 5/76* (2013.01); *H04N 9/8042* (2013.01);
(Continued)

(58) Field of Classification Search
None
See application file for complete search history.

(56) References Cited

U.S. PATENT DOCUMENTS

| | | | |
|---|---|---|---|
| 5,797,001 | A | 8/1998 | Augenbraun et al. |
| 5,973,685 | A | 10/1999 | Schaffa et al. |

(Continued)

FOREIGN PATENT DOCUMENTS

| | | | |
|---|---|---|---|
| CN | 1349719 A | 5/2005 | |
| CN | 1623153 A | 6/2005 | |

(Continued)

OTHER PUBLICATIONS

U.S. Appl. No. 14/748,121, Non-Final Office Action dated Oct. 21, 2015.

(Continued)

*Primary Examiner* — Cai Chen
(74) *Attorney, Agent, or Firm* — Haley Guiliano LLP

(57) ABSTRACT

Techniques for making content available to a DVR are described. Content encoded in any encoding format may be automatically transcoded, on a computer, into an encoding format that a DVR is configured to decode. The transcoded content is automatically sent over a LAN from the computer to the DVR. The DVR receives the transcoded content, stores the transcoded content, and indicates, through a user interface, that the content is available for viewing. A transcoding agent executing on the computer may automatically and periodically transcode, into an encoding format that the DVR is configured to decode, content that is contained in one folder, and move the transcoded content from that folder into another folder. The computer may send, to the DVR, instructions which cause the DVR to request transcoded content that is in the latter folder. The computer sends transcoded content to the DVR in response to such a request.

14 Claims, 5 Drawing Sheets

(51) Int. Cl.

| | | |
|---|---|---|
| H04N 5/76 | (2006.01) | |
| H04N 9/804 | (2006.01) | |
| H04N 21/433 | (2011.01) | |
| H04N 21/436 | (2011.01) | |
| H04N 21/472 | (2011.01) | |
| H04N 21/2183 | (2011.01) | |

(52) U.S. Cl.
CPC ..... *H04N 21/2183* (2013.01); *H04N 21/4334* (2013.01); *H04N 21/43615* (2013.01); *H04N 21/440245* (2013.01); *H04N 21/472* (2013.01)

(56) References Cited

U.S. PATENT DOCUMENTS

| | | | |
|---|---|---|---|
| 6,181,746 | B1 | 1/2001 | Hoshi |
| 6,407,680 | B1 | 6/2002 | Lai et al. |
| 6,414,447 | B1 | 7/2002 | Kitamura et al. |
| 6,463,445 | B1 | 10/2002 | Suzuki et al. |
| 6,981,045 | B1* | 12/2005 | Brooks ............. H04L 29/06027 348/E7.073 |
| 7,456,760 | B2 | 11/2008 | Normile et al. |
| 7,734,116 | B2 | 6/2010 | Panabaker et al. |
| 9,064,271 | B2 | 6/2015 | Barton |
| 9,100,702 | B2 | 8/2015 | Barton |
| 2001/0001160 | A1* | 5/2001 | Shoff ................. H04N 5/44543 725/51 |
| 2001/0049820 | A1 | 12/2001 | Barton |
| 2002/0110370 | A1 | 8/2002 | Nomura |
| 2002/0111956 | A1 | 8/2002 | Yeo et al. |
| 2002/0120925 | A1 | 8/2002 | Logan |
| 2002/0123928 | A1 | 9/2002 | Eldering et al. |
| 2002/0129360 | A1 | 9/2002 | Lee |
| 2002/0138831 | A1 | 9/2002 | Wachtfogel et al. |
| 2002/0144262 | A1 | 10/2002 | Plotnick et al. |
| 2002/0147985 | A1 | 10/2002 | Miyajima et al. |
| 2003/0066084 | A1 | 4/2003 | Kaars |
| 2003/0088872 | A1 | 5/2003 | Maissel et al. |
| 2003/0149975 | A1 | 8/2003 | Eldering et al. |
| 2003/0149988 | A1 | 8/2003 | Ellis et al. |
| 2004/0003397 | A1 | 1/2004 | Boston et al. |
| 2004/0015608 | A1 | 1/2004 | Ellis et al. |
| 2004/0073941 | A1* | 4/2004 | Ludvig ............... H04N 21/2355 725/113 |
| 2004/0148454 | A1 | 7/2004 | Seo |
| 2004/0179825 | A1 | 9/2004 | Im |
| 2004/0268387 | A1 | 12/2004 | Wending |
| 2004/0268413 | A1 | 12/2004 | Reid et al. |
| 2005/0010950 | A1 | 1/2005 | Carney et al. |
| 2005/0074063 | A1 | 4/2005 | Nair et al. |
| 2005/0076359 | A1 | 4/2005 | Pierson et al. |
| 2005/0086703 | A1 | 4/2005 | Gupta et al. |
| 2005/0210101 | A1 | 9/2005 | Janik |
| 2005/0215238 | A1 | 9/2005 | Macaluso |
| 2005/0246451 | A1* | 11/2005 | Silverman ............ G11B 27/034 709/231 |
| 2005/0289588 | A1 | 12/2005 | Kinnear |
| 2006/0029364 | A1 | 2/2006 | Kosugi |
| 2006/0041902 | A1 | 2/2006 | Zigmond |
| 2006/0088279 | A1 | 4/2006 | Tsunashima |
| 2006/0095472 | A1 | 5/2006 | Krikorian et al. |
| 2006/0100928 | A1 | 5/2006 | Walczak et al. |
| 2006/0161947 | A1 | 7/2006 | Laksono et al. |
| 2006/0223593 | A1 | 10/2006 | Ishak |
| 2007/0100690 | A1 | 5/2007 | Hopkins |
| 2007/0118425 | A1 | 5/2007 | Yruski et al. |
| 2007/0157249 | A1 | 7/2007 | Cordray et al. |
| 2007/0192789 | A1 | 8/2007 | Medford |
| 2007/0220024 | A1* | 9/2007 | Putterman ........ H04N 21/4402 |
| 2007/0300261 | A1 | 12/2007 | Barton et al. |
| 2008/0004952 | A1 | 1/2008 | Koli |
| 2008/0004954 | A1 | 1/2008 | Horvitz |
| 2008/0013622 | A1 | 1/2008 | Bao et al. |
| 2008/0015932 | A1 | 1/2008 | Haeuser et al. |
| 2008/0060002 | A1 | 3/2008 | Noll et al. |
| 2008/0062018 | A1 | 3/2008 | Normile et al. |
| 2008/0092182 | A1 | 4/2008 | Conant |
| 2008/0109298 | A1 | 5/2008 | Barton |
| 2008/0118227 | A1 | 5/2008 | Barton |
| 2008/0127249 | A1 | 5/2008 | Cruice |
| 2008/0172293 | A1 | 7/2008 | Raskin et al. |
| 2008/0313669 | A1 | 12/2008 | Acharya et al. |
| 2009/0100468 | A1 | 4/2009 | Shaffer et al. |
| 2009/0135901 | A1 | 5/2009 | Au et al. |
| 2009/0148125 | A1 | 6/2009 | Watson et al. |
| 2009/0307732 | A1 | 12/2009 | Cohen et al. |
| 2010/0042499 | A1 | 2/2010 | Barton |
| 2010/0042749 | A1 | 2/2010 | Barton |
| 2010/0151782 | A1 | 6/2010 | Sato et al. |
| 2013/0132171 | A1 | 5/2013 | Barton |
| 2013/0227621 | A1 | 8/2013 | Barton |
| 2014/0236712 | A1 | 8/2014 | Barton et al. |
| 2015/0245111 | A1 | 8/2015 | Berry et al. |
| 2015/0296230 | A1 | 10/2015 | Barton |

FOREIGN PATENT DOCUMENTS

| | | |
|---|---|---|
| CN | 1852410 A | 10/2006 |
| EP | 1199890 A2 | 4/2002 |
| EP | 1 363 215 | 11/2003 |
| JP | 2001-285777 | 10/2001 |
| JP | 2002-218403 | 8/2002 |
| JP | 2003-125098 | 8/2002 |
| JP | 2002-342218 | 11/2002 |
| JP | 2003-216863 | 7/2003 |
| JP | 2004-102339 | 4/2004 |
| JP | 2004-526227 | 8/2004 |
| JP | 2004-304405 A | 10/2004 |
| JP | 2005-513617 | 5/2005 |
| JP | 2006-146804 | 6/2006 |
| JP | 2007-013667 | 1/2007 |
| JP | 2007-133628 | 5/2007 |
| JP | 2007-159072 | 6/2007 |
| JP | 2007-226382 | 6/2007 |
| JP | 2008-102174 | 5/2008 |
| WO | WO 2001/91474 | 11/2001 |
| WO | WO 02/4199 A2 | 5/2002 |
| WO | WO 02/41199 A | 5/2002 |
| WO | WO 02/43385 A2 | 5/2002 |
| WO | WO 2002/082374 | 10/2002 |
| WO | WO 2003/010965 | 2/2003 |
| WO | WO 03/058537 | 7/2003 |
| WO | WO 2003/075569 | 9/2003 |
| WO | WO 2005/034503 | 4/2005 |
| WO | WO 2005/059676 | 6/2005 |
| WO | WO 2005/062975 | 7/2005 |
| WO | WO 2005/107253 | 11/2005 |
| WO | WO 2006/091313 | 8/2006 |
| WO | WO 2007/082190 | 7/2007 |
| WO | WO 2008/002309 A2 | 1/2008 |
| WO | WO 2008/054802 A2 | 5/2008 |

OTHER PUBLICATIONS

U.S. Appl. No. 12/191,268, Final Office Action dated Oct. 22, 2015.
U.S. Appl. No. 14/707,440, Final Office Action dated Dec. 4, 2015.
U.S. Appl. No. 13/747,414, filed Jan. 22, 2013, Office Action, dated Mar. 22, 2013.
U.S. Appl. No. 12/191,268, filed Aug. 13, 2008, Final Office Action, dated Feb. 12, 2014.
U.S. Appl. No. 13/747,414, filed Jan. 22, 2013, Notice of Allowance, dated Dec. 10, 2013.
U.S. Appl. No. 12/206,622, filed Sep. 8, 2008, Final Office Action, dated Jan. 28, 2014.
U.S. Appl. No. 11/519,717, filed Sep. 11, 2006, Final Office Action, dated Oct. 5, 2012.
U.S. Appl. No. 11/519,717, filed Sep. 11, 2006, Office Action, dated Mar. 22, 2013.
U.S. Appl. No. 11/519,717, filed Sep. 11, 2006, Final Office Action, dated Sep. 23, 2013.
U.S. Appl. No. 11/519,717, filed Sep. 11, 2006, Office Action, dated Jan. 14, 2014.

(56) References Cited

OTHER PUBLICATIONS

U.S. Appl. No. 11/519,717, filed Sep. 11, 2006, Final Office Action, dated Aug. 6, 2014.
U.S. Appl. No. 11/519,717, Final Office Action dated Aug. 6, 2014.
U.S. Appl. No. 14/265,258, Non-Final Office Action dated Sep. 16, 2014.
U.S. Appl. No. 12/191,268, Non-Final Office Action dated Jan. 9, 2015.
U.S. Appl. No. 14/265,258, Notice of Allowance dated Feb. 17, 2015.
U.S. Appl. No. 11/519,717, Notice of Allowance dated Mar. 30, 2015.
U.S. Appl. No. 13/847,450, filed Mar. 19, 2013, Office Action, dated Jul. 14, 2014.
U.S. Appl. No. 11/982,256, filed Oct. 31, 2007, Final Office Action, dated Feb. 11, 2011.
U.S. Appl. No. 13/847,450, Final Office Action dated Mar. 6, 2015.
U.S. Appl. No. 14/707,440, Non-Final Office Action dated Jun. 10, 2015.
U.S. Appl. No. 12/191,261, filed Mar. 10, 2011, Office Action, dated Mar. 10, 2011.
U.S. Appl. No. 12/191,261, filed Jan. 18, 2012, Office Action, dated Jan. 18, 2012.
U.S. Appl. No. 12/191,268, filed Sep. 14, 2011, Office Action, dated Sep. 14, 2011.
World Intellectual Property Organization, Application No. PCT/US2008/07307, Search Report dated Nov. 5, 2008, 10 pages.
World Intellectual Property Organization, Application No. PCT/US2008/073078, Claims dated Nov. 5, 2008, 7 pages.
World Intellectual Property Organization, Application No. PCT/US08/73075, Search Report dated Nov. 5, 2008, 9 pages.
World Intellectual Property Organization, Application No. PCT/US08/73075, Claims dated Nov. 5, 2008, 4 pages.
World Intellectual Property Organization, Application No. PCT/US07/19511, Search Report dated Mar. 17, 2008, 8 pages.
World Intellectual Property Organization, Application No. PCT/US07/19511, Claims dated Mar. 17, 2008, 8 pages.
"Hugo E. Martin on Media, Marketing & Internet: Google InVideo Ad Format on You Tube," Aug. 22, 2007, http://google-invideo-ad-format-on-you-tube.html, printed Mar. 4, 2009, 12 pages.
Chinese Patent Office, Application No. 200780033665.0, "Notification of the First Office Action" dated Jun. 10, 2010, 16 pages.
Chinese Patent Office, Application No. 200780033665.0, Claims, 10 pages.
Canadian Intellectual Property Office Application No. 2,660,783, "Office Action-Requisition by the Examiner" dated Nov. 2, 2010, 2 pgs.
Canadian Intellectual Property Office Application No. 2,660,783, Claims dated Nov. 2, 2010, 10 pgs.
Intellectual Property of Singapore, Search Report and Written Opinion received in Singapore patent application No. 201100945-3, dated Jun. 11, 2012, 10 pages.
European Patent Office, Application No. 08 797 830.0, "First Office Action" dated Feb. 4, 2013, 4 pages.
European Patent Office, Application No. 08 797 830.0, Claims dated Feb. 2013, 5 pages.
Chinese Patent Office, Application No. 200880131538.9, "Notification of the First Office Action" dated Jan. 24, 2013, 6 pages.
Chinese Patent Office, Application No. 200880131538.9, Claims dated Jan. 2013, 3 pages.
Chinese Patent Office, Application No. 200880131539.3, "Notification of the Second Office Action" dated Jan. 31, 2013, 6 pages.
Chinese Patent Office, Application No. 200880131539.3, Claims dated Jan. 2013, 4 pages.
Singapore Patent Office, Application No. 201100931-3, "Examination Report" dated Feb. 13, 2013, 8 pages.
Singapore Patent Office, Application No. 201100931-3, Claims dated Feb. 2013, 6 pages.
European Patent Office, Application No. 08 782 712.7, Office Action dated Feb. 26, 2013, 11 pages.
European Patent Office, Application No. 08 782 712.7, Claims dated Feb. 2013, 7 pages.
Singapore Patent Office, Application No. 201100945-3, "Examination Report" dated Mar. 7, 2013, 8 pages.
Japanese Patent Office, Application No. 2012-040619, "Notification of Reasons for Rejection" dated Aug. 6, 2013, 4 pages.
Japanese Patent Office, Application No. 2012-040619, Claims dated Feb. 2012, 4 pages.
Canadian Intellectual Property Office, Application No. 2,660,783, "Office Action" dated Jul. 31, 2013, 3 pages.
Canadian Intellectual Property Office, Application No. 2,660,783, Claims dated Jul. 2013, 14 pages.
Chinese Patent Office, Application No. 200880131538.9, Notification of Second Office Action dated May 9, 2014, 7 pages.
Chinese Patent Office, Application No. 200880131538.9, Claims dated May 2014, 2 pages.
Singapore Patent Office, Application No. 201100945-3, "Search Report and Written Opinion" dated Jun. 11, 2012, 10 pages.
Singapore Patent Office, Application No. 201100945-3, Claims dated Jun. 2012, 4 pages.
Canadian Intellectual Property Office, Application No. 2,732,673, Claims dated Mar. 2013, 4 pages.
Canadian Intellectual Property Office, Application No. 2,732,673, "Office Action" dated Mar. 22, 2013, 4 pages.
Canadian Intellectual Property Office, Application No. 2,732,674, "Office Action" dated Mar. 26, 2013, 6 pages.
Canadian Intellectual Property Office, Application No. 2,732,674, Claims dated Mar. 2013, 6 pages.
Japanese Patent Office, Application No. 2011-522951, "Notification of Reasons for Rejection" dated Oct. 1, 2013, 3 pages.
Japanese Patent Office, Application No. 2011-522951, Claims dated Oct. 1, 2013, 7 pages.
Japan Patent Office Application No. 2012-040619, "Notification of Reasons for Rejection" dated Jul. 8, 2014, 3 pages.
Japan Patent Office Application No. 2012-040619, Claims dated Jul. 2014, 4 pages.
"3. Downloading Whatever Flash Content You Want", PC Japan, Softbank Creative Corp., dated Feb. 1, 2006, vol. 11, No. 2, pp. 36 and 37.
"Full Customization of Firefox", Mac People, ASCII Corp., dated Mar. 1, 2006, vol. 12, No. 3, pp. 140-145.
"Pegasus Movie to Portable", PC Fan, Mynavi Corporation, dated May 1, 2006, vol. 13, No. 11 p. 128.
European Patent Office Application No. 07837865.0-1907, Search Report dated Jul. 9, 2014, 12 pages.
European Patent Office Application No. 07837865.0-1907, Claims dated Jul. 2014, 4 pages.
European Patent Office, Application No. 07837865.0, Office Action dated Jul. 9, 2014.
European Patent Office, Application No. 07837865.0, Pending Claims as of Jul. 9, 2014.
Chinese Patent Office, Application No. 201210347239.7, Foreign Office Action dated Oct. 8, 2014.
Chinese Patent Office, Application No. 201210347239.7, Pending Claims as of Oct. 8, 2014.
Chinese Patent Office, Application No. 200880131538.9, Foreign Office Action dated Jan. 14, 2015.
Chinese Patent Office, Application No. 200880131538.9, Pending Claims as of Jan. 14, 2015.
Japanese Patent Office, Application No. 2012-040619, Foreign Office Action dated Apr. 14, 2015.
Japanese Patent Office, Application No. 2012-040619, Pending Claims as of Apr. 14, 2015.
Australian Patent Office, Application No. 2012200077, Patent Examination Report No. 1 dated Sep. 3, 2013, 3 pages.
Australian Patent Office, Application No. 2012200077, Claims dated Sep. 3, 2013, 7 pages.
European Patent Office, Application No. 07 863 7212.2-1905, "Search Report" dated Apr. 2, 2014, 7 pages.
European Patent Office, Application No. 07 863 7212.2-1905, "Search Report" dated Apr. 2014, 3 pages.
Chinese Patent Office, Application No. 201110229927.9, "Notification of Second Office Action" dated May 28, 2014, 7 pages.

(56) References Cited

OTHER PUBLICATIONS

Chinese Patent Office, Application No. 201110229927.9, Claims dated May 2014, 3 pages.
European Patent Office, Application No. 07839886.4-1955, "Summons to Attend Oral Proceedings" dated Jul. 1, 2014, 7 pages.
European Patent Office, Application No. 07839886.4-1955, Claims dated Jul. 2014, 4 pages.
Microsoft Press Computer Dictionary, Definition of Queue (Third edition), Aug. 1997, 1 page.
dictonary.com, "Definition of Queue", retrieved from [URL:http://dictionary.reference.com/browse/queque] on Apr. 5, 2011, 2 pages.
Australian Patent Office, Application No. 2007314276, "Foreign Office Action" dated Mar. 28, 2011, 3 pages.
Australian Patent Office, Application No. 2007314276, Claims dated Mar. 2011, 5 pages.
Chinese Patent Office, Application No. 200780038448.0, "Notification of Second Office Action" dated Apr. 25, 2011, 6 pages.
Chinese Patent Office, Application No. 200780038448.0, Claims dated Apr. 2011, 4 pages.
International Search Report for application No. PCT/US07/83059 dated Mar. 18, 2008 (3 pgs).
Written Opinion for application No. PCT/US07/83059 dated Mar. 18, 2008 (5 pgs).
Chinese Patent Office, Application No. 200780040475.1, Claims dated Nov. 2010, 7 pages.
Australian Patent Office, Application No. 2007313659, "Examiner's First Report" dated Apr. 13, 2010, 3 pages.
Australian Patent Office, Application No. 2007313659, Claims dated Apr. 2010, 6 pages.
Australian Patent Office, Application No. 2007314276, "Examiner's First Report" dated Apr. 20, 2010, 2 pages.
Australian Patent Office, Application No. 2007314276, Claims dated Apr. 2010, 5 pages.
Australian Patent Office, Application No. 2007313700, "Examiner's First Report" dated May 6, 2010, 2 pages.
Australian Patent Office, Application No. 2007313700, Claims dated May 2010, 6 pages.
Canadian Intellectual Property Office, Application No. 2,662,665, "Office Action" dated May 31, 2011, 2 pages.
Canadian Intellectual Property Office, Application No. 2,662,665, "Office Action" dated May 2011, 6 pages.
Chinese Patent Office, Application No. 200780040475.1, "Notification of the First Office Action" dated Nov. 30, 2010, 8 pages.
Australian Patent Office, Application No. 2007314276, Claims dated Aug. 2010, 5 pages.
Chinese Patent Office, Application No. 200780038448.0, "Notification of the First Office Action" dated Sep. 1, 2010, 13 pages.
Chinese Patent Office, Application No. 200780038448.0, Claims dated Sep. 2010, 7 pages.
Chinese Patent Office, Application No. 200780038448.0, "Notification of Third Office Action" dated Aug. 5, 2011, 8 pages.
Chinese Patent Office, Application No. 200780038448.0, "Notification of Third Office Action" dated Aug. 2011, 5 pages.
Chinese Patent Office, Application No. 200780038448.0, "Notification of Fourth Office Action" dated Jun. 5, 2012, 9 pages.
Chinese Patent Office, Application No. 200780038448.0, Claims dated Jun. 2012, 5 pages.
Canadian Intellectual Property Office, Application No. 2,662,825, "Office Action" dated Jun. 8, 2012, 2 pages.
Canadian Intellectual Property Office, Application No. 2,662,825, Claims dated Jun. 2012, 6 pages.
Australian Patent Office, Application No. 2011200369, "Examination Report No. 1" dated Jun. 26, 2012, 3 pages.
Australian Patent Office, Application No. 2011200369, Claims dated Jun. 2012, 3 pages.
Japanese Patent Office, Application No. 2009-534947, "Decision of Rejection" dated Aug. 7, 2012, 3 pages.
Japanese Patent Office, Application No. 2009-534947, Claims dated Aug. 2012, 6 pages.
European Patent Office, Application No. 07 839 886.4-1238, "Office Action" dated Jul. 13, 2012, 7 pages.
European Patent Office, Application No. 07 839 886.4-1238, Claims dated Jul. 2012, 4 pages.
Singapore Patent Office, Application No. 200902702-0, "Search and Examination Report" dated Aug. 10, 2012, 9 pages.
International Searching Authority, "Search Report" in application No. PCT/US07/83201, dated May 20, 2008, 9 pages.
Claims in application No. PCT/US07/83059, dated May 2008, 6 pages.
European Patent Office, Application No. 07863721.2, "Search Report" dated Mar. 29, 2012, 8 pages.
European Patent Office, Application No. 07863721.2, Claims dated Mar. 2012, 3 pages.
Singapore Patent Office, Application No. 22009027020, "Search Report and Written Opinion" dated Jul. 15, 2010, 23 pages.
Singapore Patent Office, Application No. 22009027020, Claims dated Jul. 2010, 6 pages.
Canadian Intellectual Property Office, Application No. 2,665,731, "Office Action" dated Nov. 26, 2010, 2 pages.
Canadian Intellectual Property Office, Application No. 2,665,731, Claims dated Nov. 2010, 5 pages.
Canadian Intellectual Property Office, Application No. 2,665,731, "Office Action" dated Nov. 7, 2011, 2 pages.
Canadian Intellectual Property Office, Application No. 2,665,731, Claims dated Nov. 2011, 8 pages.
Canadian Intellectual Property Office, Application No. 2,662,825, "Office Action" dated Dec. 14, 2010, 2 pages.
Canadian Intellectual Property Office, Application No. 2,662,825, Claims dated Dec. 2010, 6 pages.
Chinese Patent Office, Application No. 200780040918.7, "Notification of the Second Office Action" dated Apr. 20, 2011, 11 pages.
Chinese Patent Office, Application No. 200780040918.7, Claims dated Apr. 2011, 3 pages.
Chinese Patent Office, Application No. 200780040918.7, "Notification of the First Office Action" dated Sep. 9, 2010, 21 pages.
Chinese Patent Office, Application No. 200780040918.7, Claims dated Sep. 2010, 5 pages.
European Patent Office, Application No. 07844743.0, "Search Report" dated Oct. 4, 2011, 7 pages.
European Patent Office, Application No. 07844743.0, Claims dated Oct. 2011, 4 pages.
Japanese Patent Office, Application No. 2009-534947, "Reasons for Rejection" dated Dec. 6, 2011, 4 pages.
Japanese Patent Office, Application No. 2009-534947, Claims dated Dec. 2011, 6 pages.
Japanese Patent Office, Application No. 2009-534943, "Notification of Reason for Rejection" dated Jan. 4, 2012, 10 pages.
Japanese Patent Office, Application No. 2009-534943, Claims dated Jan. 2012, 8 pages.
Singapore Patent Office, "Search Report and Written Opinion" in application No. 189554, dated Jul. 15, 2010, 30 pages.
Singapore Patent Office, Application No. 189554, Claims dated Jul. 2010, 9 pages.
International Searching Authority, "Search Report and Written Opinion" in application No. PCT/US0723049, dated Mar. 14, 2008, 6 pages.
European Patent Office, Application No. 07839886.4, Foreign Office Action dated Dec. 19, 2014.
European Patent Office, Application No. 07839886.4, Pending Claims as of Dec. 19, 2014.
Chinese Patent Office, Application No. 201110229927.9, Foreign Office Action dated Feb. 10, 2015.
Chinese Patent Office, Application No. 201110229927.9, Pending Claims as of Feb. 10, 2015.
Chinese Patent Office, Application No. 201210347239.7, Foreign Office Action dated Jun. 2, 2015.
Chinese Patent Office, Application No. 201210347239.7, Pending Claims as of Jun. 2, 2015.
Japanese Patent Office, Application No. 2011-522951, "Notification of Reasons for Rejection" dated Dec. 4, 2012, 4 pages.
Japanese Patent Office, Application No. 2011-522951, Claims dated Dec. 2012, 7 pages.

(56) References Cited

OTHER PUBLICATIONS

Australian Patent Office, Application No. 2010241298, "Patent Examination Report No. 1" dated Oct. 18, 2012, 3 pages.
Australian Patent Office, Application No. 2010241298, Claims dated Oct. 2012, 2 pages.
Canadian Intellectual Property Office Application No. 2,660,783, Claims dated Nov. 2011, 9 pgs.
Canadian Intellectual Property Office Application No. 2,660,783, Office Action dated Nov. 7, 2011, 3 pgs.
Japanese Patent Office, Application No. 2009-527420, Claims date Sep. 2011, 9 pages.
Japanese Patent Office, Application No. 2009-527420, "Notification of Reasons for Rejection" dated Sep. 27, 2011, 5 pages.
Japanese Patent Office, Application No. 2009-527420, Office Action dated Apr. 10, 2012, 4 pages.
Japanese Patent Office, Application No. 2009-527420, Claims date Feb. 2012, 9 pages.
Australian Patent Office, Application No. 2007294935 "Examiner's First Report" dated Mar. 10, 2010, 2 pages.
Australian Patent Office, Application No. 2007294935 Claims dated Mar. 2010, 5 pages.
Japanese Patent Office, Application No. 2011-522950, "Notification of Reason for Rejection" dated Jun. 5, 2012, 4 pages.
Japanese Patent Office, Application No. 2011-522950, Claims dated Jun. 2012, 4 pages.
Singapore Patent Office, Application No. 201100931-3, "Search Report and Written Opinion" dated May 3, 2012, 14 pages.
Singapore Patent Office, Application No. 201100931-3, Claims dated May 2012, 6 pages.
European Patent Office, Application No. 08 782 712.7, "Search Report" dated Nov. 18, 2011, 11 pages.
European Patent Office, Application No. 08 782 712.7, Claims dated Nov. 2011, 11 pages.
European Patent Office, Application No. 08 797 830.0, "Search Report" dated Nov. 28, 2011, 7 pages.
European Patent Office, Application No. 08 797 830.0, Claims dated Nov. 2011, 4 pages.
Australian Patent Office, Application No. 2008360619 "Examiner's First Report" dated Feb. 28, 2012, 2 pages.
Australian Patent Office, Application No. 2008360619 Claims dated Feb. 2012, 4 pages.
Australian Patent Office, Application No. 2008360620 "Examiner's First Report" dated Feb. 27, 2012, 2 pages.
Australian Patent Office, Application No. 2008360620 Claims dated Feb. 2012, 6 pages.
European Patent Office, Application No. 07837865.0, Foreign Office Action dated Aug. 27, 2015.
European Patent Office, Application No. 07837865.0, Pending Claims dated Aug. 27, 2015.
Chinese Patent Office, Application No. 200880131538.9, Foreign Office Action dated Feb. 16, 2016.
Chinese Patent Office, Application No. 200880131538.9, Pending Claims as of Feb. 16, 2016.
European Patent Office, Application No. 08797830.0, Pending Claims as of Feb. 8, 2016.
European Patent Office, Application No. 08797830.0, Summons to Oral Proceedings dated Feb. 8, 2016.
U.S. Appl. No. 14/748,121, Final Office Action dated May 23, 2016.
U.S. Appl. No. 14/748,121, Notice of Allowance dated Sep. 1, 2016.
European Patent Office, Application No. 07837865.0, Foreign Office Action dated Jul. 18, 2016.
European Patent Office, Application No. 07837865.0, Pending Claims as of Jul. 18, 2016.
European Patent Office, Application No. 08797830.0, Foreign Office Action dated Sep. 8, 2016.
European Patent Office, Application No. 08797830.0, Pending Claims as of Sep. 8, 2016.

* cited by examiner

PERSONAL CONTENT DISTRIBUTION NETWORK

CROSS-REFERENCE TO RELATED APPLICATIONS

This application claims benefit as a Continuation of U.S. patent application Ser. No. 11/519,717, filed Sep. 11, 2006, which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to digital video recorders (DVRs).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the digital video recorder (DVR) to the consumer world has revolutionized the way viewers watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

DVRs are becoming as widespread in homes as personal computers have become. In fact, many homes now contain several devices, such as computers and DVRs, which are connected (physically or wirelessly) to local area networks (LANs) for those homes. Devices that are connected to the same LAN can send information to and receive information from each other. A LAN may be connected to the Internet. Through a LAN's internet connection, devices that are connected to the LAN can send information to and receive information from other devices that are connected to the Internet. LAN-connected DVRs can send information to and receive information from other devices on the LAN, including computers. If the LAN to which the DVR is connected is also connected to the Internet, then the DVR can send information to, and receive information from, other devices that are connected to the Internet.

Because some encoding formats provide better compression than other encoding formats, and because DVRs' storage space is limited, DVRs are often configured to decode only content that has been encoded according to one of a specified set of encoding formats. For example, a particular type of DVR might be configured to decode only content that has been encoded according to the MPEG-2 encoding format. Some content that is available through the Internet might be in an encoding format that a DVR has not been configured to decode. A DVR's inability to decode content that has been encoded according to some popular encoding formats detrimentally limits the amount of Internet-available content that the DVR can receive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
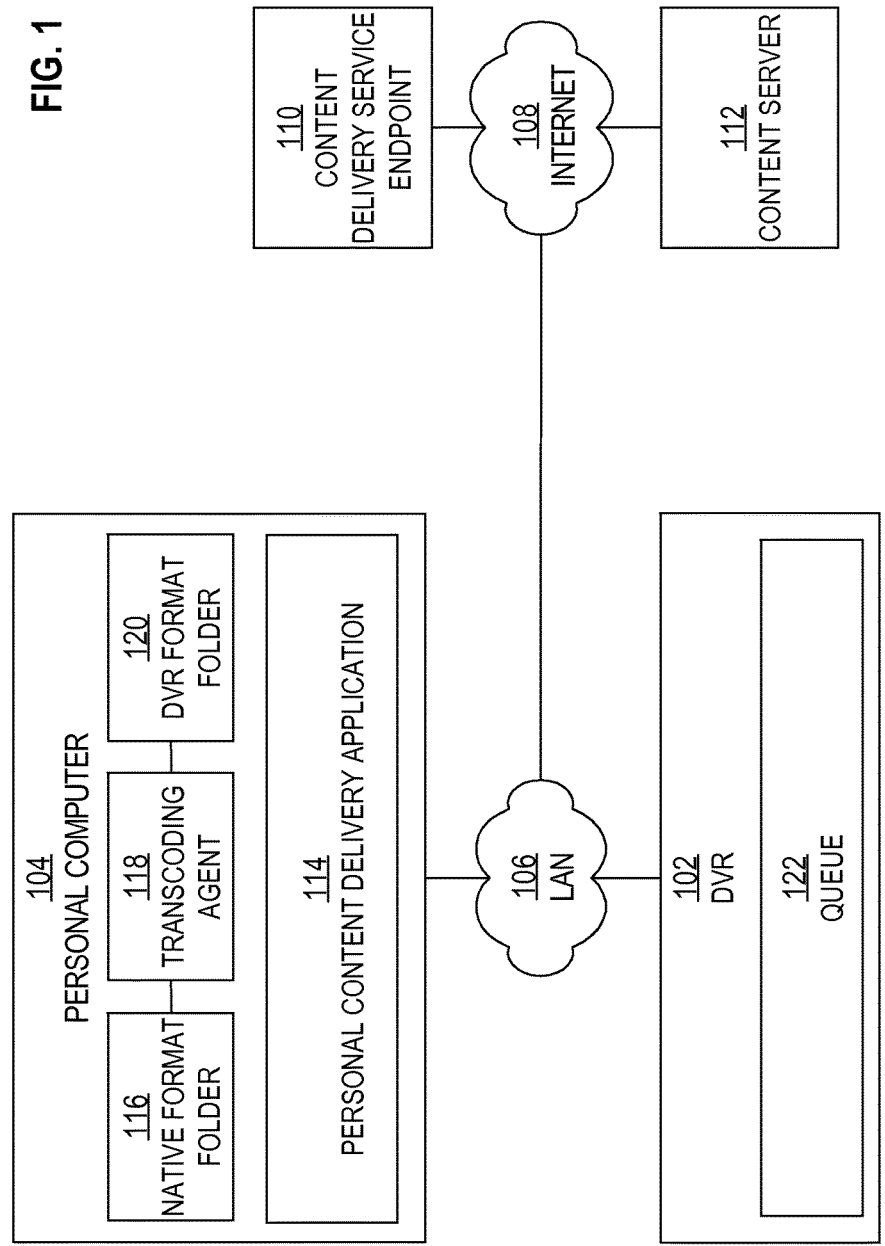
FIG. 1 is a block diagram that illustrates a system in which Internet-available content may be delivered to a DVR in an automated manner, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

| | |
|---|---|
| 1.0 | General Overview |
| 2.0 | System Structural Overview |
| 3.0 | Example Techniques |
| 4.0 | On-Demand Transcoding |
| 5.0 | Example DVR |
| 6.0 | Implementation Mechanisms—Hardware Overview |

1.0 General Overview

One highly popular type of DVR employs multiple techniques for sending content (such as a stored television program) to a computer and receiving content from a computer that is connected to the same LAN to which the DVR is connected. According to a technique used by this type of DVR, an application program (referred to hereafter simply as an "application") executes on the computer. A user can instruct the application to request, from the DVR, content that is stored on the DVR. In response to receiving such a request, the DVR sends the requested content over the LAN to the computer, which stores the content. Additionally, a user can instruct the DVR to request, from the computer, content that is stored on the computer. In response to receiving such a request, the application sends the requested content over the LAN to the DVR, which stores the content.

According to another technique used by this type of DVR, an authorized "service endpoint," which usually is controlled by an organization from which the DVR obtains program guide information, sends an instruction to the DVR via the Internet. The instruction includes a Uniform Resource Locator (URL) chosen by the authorized service endpoint. In response to receiving such an instruction from the authorized service endpoint, the DVR sends a request over the Internet to a server that is associated with the URL. The request asks the server to send, to the DVR, content that is identified by the URL. Usually, in response to such a request, the server will send the requested content to the DVR over the Internet. The DVR receives and stores the content. Subsequently, the DVR may indicate, through a user interface that the DVR displays to a user, that the content is available for viewing. In this manner, the authorized service endpoint may cause the DVR to provide specified content that is available through the Internet.

According to one embodiment of the invention, content (e.g., video) that is encoded in any encoding format is automatically transcoded, on a computer, into an encoding format that a DVR is configured to decode. The transcoded content is automatically sent from the computer, over a LAN to which both the computer and the DVR are connected (physically or wirelessly), to the DVR. The DVR receives the transcoded content, stores the transcoded content, and indicates, through a user interface, that the content is available for viewing at the DVR user's leisure. Thus, Internet-available content that is encoded in a native format that the DVR is not capable of understanding may be automatically downloaded and transcoded into an encoding format that the DVR is capable of understanding, thereby increasing the quantum of content that the DVR can obtain from the Internet and present to a user.

According to one embodiment of the invention, a transcoding agent executes on the computer discussed above. The transcoding agent automatically and periodically determines whether any content has been added to a "native format" folder on the computer's hard drive since the last time that the transcoding agent made such a determination. In response to determining that content has been added to the native format folder since the last time, the transcoding agent determines whether the content is encoded in an encoding format that the DVR is configured to decode. In response to determining that the content is encoded in an encoding format that the DVR is configured to decode, the transcoding agent moves the content from the native format folder into a "DVR format" folder on the computer's hard drive. Alternatively, in response to determining that the content is not encoded in an encoding format that the DVR is configured to decode, the transcoding agent transcodes the content into an encoding format that the DVR is configured to decode, as discussed above, and then moves the transcoded content from the native format folder into the DVR format folder.

Content may be added to the native format folder in a variety of ways. For example, a user of the computer may move content into the native format folder from some other location on the computer's hard drive. For another example, a process executing on the computer may automatically download content from a source on the Internet (e.g., content from a site to which the process "subscribes"). The process may be configured to store all downloaded content, in the content's native encoding format, in the native format folder.

According to one embodiment of the invention, a "personal delivery content" application also executes on the computer discussed above. The personal delivery content application automatically and periodically determines whether any content has been added to the DVR format folder since the last time that the application made such a determination. In response to determining that content has been added to the DVR format folder since the last time that the personal delivery content application checked, the application generates an instruction and sends the instruction over the LAN to the DVR. The instruction contains a URL that identifies both the computer (e.g., via the computer's IP address) and the content that was added to the DVR format folder.

According to one embodiment of the invention, in response to receiving such an instruction, the DVR places the instruction in a queue. The DVR removes instructions from the queue and requests (e.g., via Hypertext Transfer Protocol (HTTP) requests sent over a LAN and/or the Internet) the content specified in the instructions' URLs from the sources specified in the instructions' URLs. The DVR receives responses (e.g., HTTP responses) that contain the specified content. The DVR stores the received content as discussed above.

Embodiments of the invention summarized above are described below in greater detail, along with some alternative embodiments of the invention.

2.0 System Structural Overview

FIG. 1 is a block diagram that illustrates a system in which Internet-available content may be delivered to a DVR in an automated manner, according to one embodiment of the invention. The system comprises a DVR 102 (such as is described with reference to FIG. 5 below) and a personal computer 104 (such as is described with reference to FIG. 4 below). DVR 102 communicates with personal computer 104 through a LAN 106. LAN 106 is connected (e.g., through a network router) to the Internet 108. Also connected to Internet 108 are a content delivery service endpoint 110 and a content server 112.

In one embodiment of the invention, content delivery service endpoint 110 is configured to send instructions toward DVR 102 over Internet 108 and LAN 106. Content delivery service endpoint 110 may comprise a computer on which executes a process that sends such instructions, for example. According to one embodiment of the invention, each instruction comprises a URL.

In one embodiment of the invention, content server 112 is associated with a URL. Content server 112 may comprise an HTTP server that (i) listens for Hypertext Transfer Protocol requests received through Internet 108 and (ii) responds to such HTTP requests by sending HTTP responses over Internet 108 toward the sources of those HTTP requests. The HTTP requests may specify content that the requestor desires, and the corresponding HTTP responses may contain the desired content, which is stored on content server 112. Such content may comprise encoded video content, for example.

In one embodiment of the invention, DVR 102 is configured to listen for and receive, through Internet 108 and LAN 106, instructions sent from content delivery service endpoint 110. DVR 102 is configured to store such instructions in a queue 122 that DVR 102 maintains. DVR 102 is configured to remove an instruction from the front of queue 122, determine a URL that the instruction specifies, and send, toward a content server or other device that is associated with that URL, an HTTP request for content that the URL specifies. DVR 102 is configured to listen for and receive an HTTP response to such an HTTP request. DVR 102 is configured to store content that is contained in such an HTTP response. DVR 102 is configured to indicate, through a user interface, that the stored content is available for viewing by a user.

In one embodiment of the invention, personal computer 104 comprises a native format folder 116. Native format folder 116 may contain encoded content that is encoded in an encoding format that DVR 102 is not configured to decode, for example. Native format folder 116 may be a directory for a file system that is stored on a hard drive of personal computer 104, for example.

In one embodiment of the invention, personal computer 104 additionally comprises a transcoding agent 118 that periodically and automatically removes encoded content from native format folder 116, transcodes the removed content into a specified encoding format that DVR 102 is configured to decode, and stores the transcoded content into a DVR format folder 120. Transcoding agent 118 is configured to perform these actions relative to each encoded content item that appears in native format folder 116 without being separately instructed to do so by a human for each such encoded content item. Transcoding agent 118 may be a process that executes on personal computer 104, for example. DVR format folder 120 may be a directory of a file system that is stored on a hard drive of personal computer 104, for example.

In one embodiment of the invention, personal computer 104 additionally comprises a personal content delivery application 114 that periodically and automatically determines whether any content has been placed in DVR format folder 120 since the last time that personal content delivery application 114 made that determination. In response to a determination that such content has been placed in DVR format folder 120, personal content delivery application 114 is configured to generate an instruction that contains a URL that identifies (i) an Internet Protocol (IP) address of personal computer 104 and (ii) a filename and path that is associated with the content that has been placed in DVR format folder 120. Personal content delivery application 114 is configured to send such an instruction over LAN 106 to DVR 102.

In one embodiment of the invention, personal computer 104 additionally comprises an HTTP server (not shown) that (i) listens for Hypertext Transfer Protocol (HTTP) requests received through LAN 106 and (ii) responds to such HTTP requests by sending HTTP responses over LAN 106 toward the sources of those HTTP requests. Such an HTTP server may be a part of, or separate from, personal content delivery application 114.

In one embodiment of the invention, DVR 102 is configured to handle instructions received from personal content delivery application 114 in a manner similar to the way that DVR 102 is configured to handle instructions received from content delivery service endpoint 110. DVR 102 is configured to listen for and receive, through LAN 106, instructions sent from personal content delivery application 114. DVR 102 is configured to store such instructions in queue 122. DVR 102 is configured to remove such an instruction from the front of queue 122, determine a URL that the instruction specifies—in this case, a URL associated with personal computer 104 rather than another content server—and send, toward personal computer 104, an HTTP request for content that the URL specifies. DVR 102 is configured to listen for and receive an HTTP response to such an HTTP request. DVR 102 is configured to store content that is contained in such an HTTP response. DVR 102 is configured to indicate, through a user interface, that the stored content is available for viewing by a user.

3.0 Example Techniques

According to one embodiment of the invention, personal computer 104 automatically downloads content that is available at an Internet site (e.g., at content server 112) via Internet 108 and LAN 106. After personal computer 104 has downloaded the content, personal computer 104 automatically transcodes the content into an encoding format that DVR 102 can understand. After the content has been transcoded, personal computer 104 sends, to DVR 102, an instruction that causes DVR 102 to download the transcoded content from personal computer 104. Thereafter, DVR 102 can present the stored content to a user at the user's leisure.

For example, a user might configure an application executing on personal computer 104 to "subscribe" to "www.youtube.com." Due to this subscription, personal computer 104 might periodically and automatically download, from "www.youtube.com," one or more new video files that have become available at that site since the last time that personal computer 104 checked that site. One or more of the downloaded files might be encoded in H.263, H.264, DivX, Real, Flash, etc. DVR 102 might not understand these encoding formats. Therefore, after downloading the files, personal computer 104 might automatically transcode those of the files that are in an encoding format that DVR 102 cannot understand into an encoding format that DVR 102 can understand (e.g., MPEG-2). Personal computer 104 then might instruct DVR 102 to download the DVR-understandable files from personal computer 104 and store the files for later presentation to a user of DVR 102.

Figure 2:
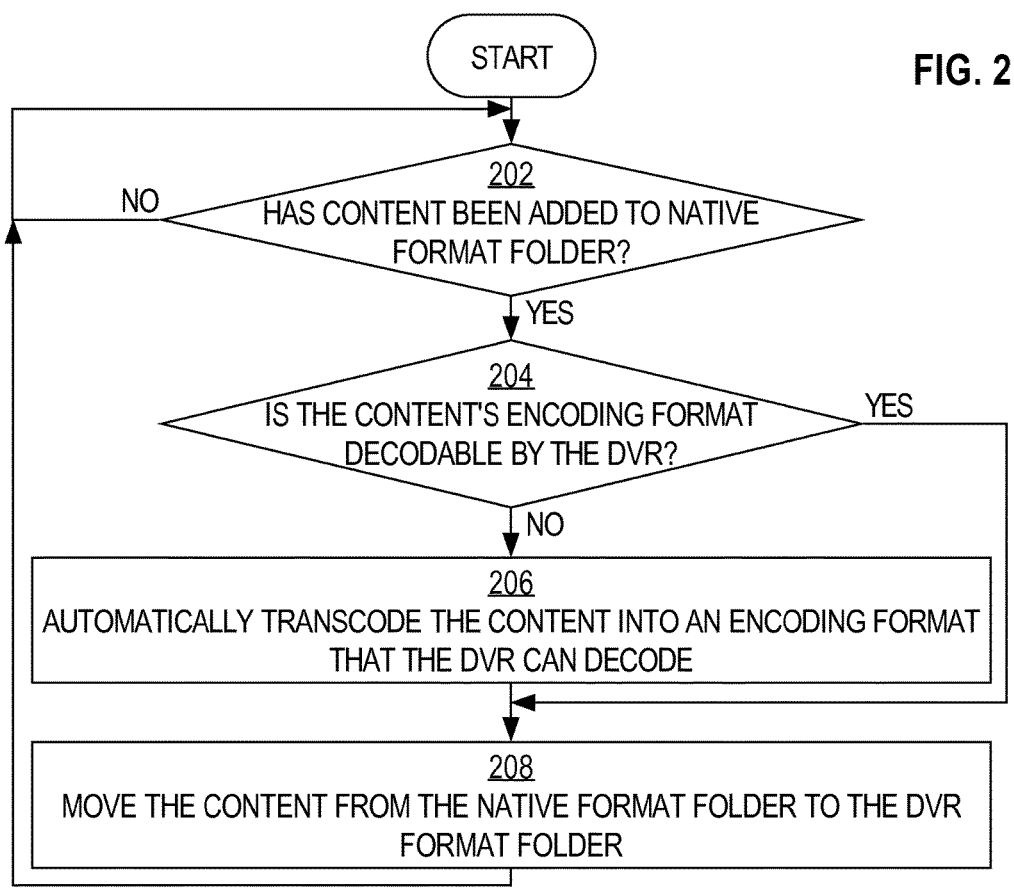
FIG. 2 is a flow diagram that illustrates the steps of a technique for automatically transcoding content on behalf of a DVR, according to one embodiment of the invention.

FIG. 2 is a flow diagram that illustrates the steps of a technique for automatically transcoding content on behalf of a DVR, according to one embodiment of the invention. The technique described below may be performed by personal computer 104, for example. More specifically, the technique described below may be performed by transcoding agent 118. In various alternative embodiments of the invention, more or fewer steps than those shown in FIG. 2 may be performed.

In block 202, a determination is made as to whether content has been placed in a native format folder on a computer since a last time that such a determination was made. For example, transcoding agent 118 may periodically and automatically determine whether content, which was not in native format folder 116 the last time that transcoding agent 118 made such a determination, has been placed in native format folder 116. If content has been placed in the native format folder since the last time, then control passes to block 204. Otherwise, control passes back to block 202.

During this time, content, which is encoded in an encoding format that a DVR is not configured to decode, may be placed in the native format folder in a variety of ways. For example, another process (e.g., a Really Simple Syndication (RSS) feed-subscribing process) executing on personal computer 104 may periodically and automatically determine whether new content has been made available on content server 112. In response to determining that new content has been made available on content server 112, the process may automatically download the content over Internet 108 and LAN 106 and store the content in native format folder 116.

For another example, a user of personal computer 104 may move, to native format folder 116, content that is stored elsewhere on personal computer 104. Regardless of the mechanism by which content becomes placed in native format folder 116, the content might be encoded (as a result of prior encoding) in an encoding format that DVR 102 is not configured to decode, interpret, or display. For example, DVR 102 might be configured to decode only motion video content that has been encoded in the MPEG-2 encoding format, but the motion video content placed in native format folder 116 might be encoded in some other encoding format (e.g., H.263, H.264, DivX, Real, Flash, etc.). For another example, DVR 102 might be configured to decode only audio content that has been encoded in the MP3 encoding format, but the audio content placed in native format folder 116 might be encoded in some other encoding format (e.g., Waveform Audio Format (WAV), Advanced Audio Coding (AAC), etc.). For another example, DVR 102 might be might be configured to decode only still image content that has been encoded in the Joint Photographic Experts Group (JPEG) encoding format, but the still image content placed in native format folder 116 might be encoded in some other encoding format (e.g., Graphics Interchange Format (GIF), Tagged Image File Format (TIFF), etc.)

In block 204, a determination is made as to whether the content that was placed in the native format folder is encoded in a format that a DVR is configured to decode. For example, transcoding agent 118 may determine whether the content is encoded in an encoding format that DVR 102 is configured to decode. If the content is encoded in a format that the DVR is not configured to decode, then control passes to block 206. Otherwise, control passes to block 208.

In block 206, the content is automatically transcoded into an encoding format that the DVR is configured to decode. For example, transcoding agent 118 may transcode the content from the content's native encoding format into an encoding format (e.g., MPEG-2, MP3, or JPEG, depending on the content's media type) that DVR 102 is configured to decode. Control passes to block 208.

In block 208, the content, which is at this point encoded in an encoding format that the DVR is configured to decode, is moved from the native format folder to a DVR format folder. For example, transcoding agent 118 may automatically move the content from native format folder 116 to DVR format folder 120. Control passes back to block 202, in which content that has been subsequently placed in the native format folder may be detected.

As a result of the foregoing technique, content that is encoded in an encoding format that a DVR is capable of decoding is placed in the DVR format folder. Such content may be automatically gathered from various servers accessible through the Internet. Because the content is automatically transcoded if necessary, the type of content that can be delivered to the DVR is not limited to content that already has been encoded in an encoding format that the DVR is capable of decoding.

Figure 3A:
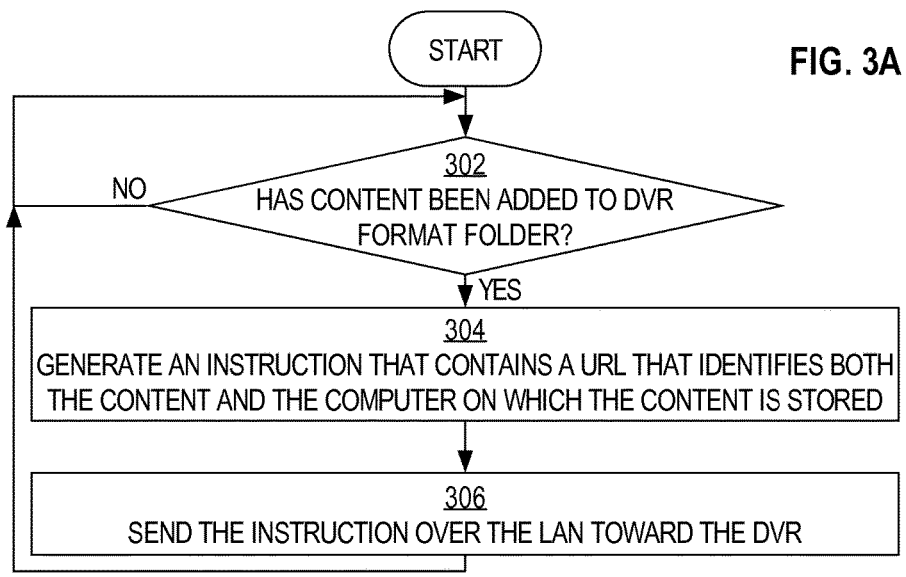
FIGS. 3A and 3B are flow diagrams that illustrate the steps of techniques for automatically delivering content from a computer to a DVR that is connected to a LAN to which the computer is connected, according to one embodiment of the invention.
Figure 3B:
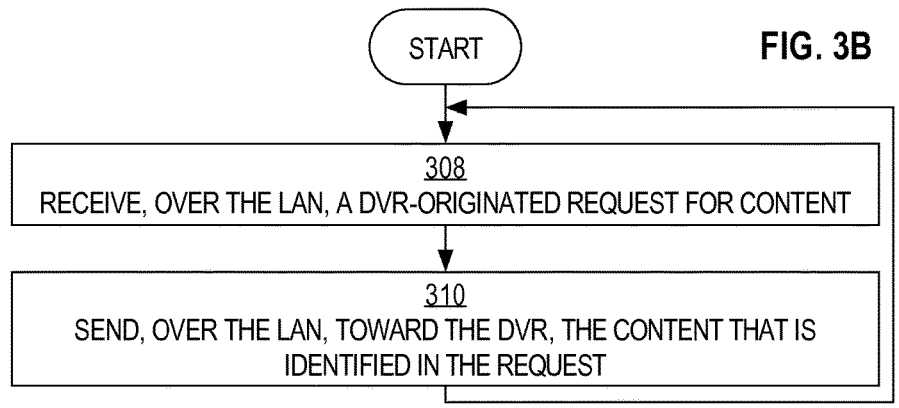

While the technique described above with reference to FIG. 2 is being performed, techniques described below with reference to FIGS. 3A and 3B may be performed concurrently. FIGS. 3A and 3B are flow diagrams that illustrate the steps of techniques for automatically delivering content from a computer to a DVR that is connected to a LAN to which the computer is connected, according to one embodiment of the invention. The techniques described below may be performed by personal computer 104, for example. More specifically, one or more of the techniques described below may be performed by personal content delivery application 114. In various alternative embodiments of the invention, more or fewer steps than those shown in FIGS. 3A and 3B may be performed.

Referring first to FIG. 3A, in block 302, a determination is made as to whether content has been placed in a DVR format folder on a computer since a last time that such a determination was made. For example, personal content delivery application 114 may periodically and automatically determine whether content, which was not in the DVR format folder 120 the last time that personal content delivery application 114 made such a determination, has been placed in DVR format folder 120. If content has been placed in the DVR format folder since the last time, then control passes to block 304. Otherwise, control passes back to block 302.

During this time, DVR-decodable content may be placed in the DVR format folder. For example, transcoding agent 118 may periodically place such content in DVR format folder 120 as a consequence of performing the technique described above with reference to FIG. 2.

In block 304, an instruction is generated. In one embodiment of the invention, the instruction contains a URL; in alternative embodiments of the invention, the instruction may contain non-URL metadata that serves the same purposes that a URL would. In one embodiment of the invention, the URL identifies (i) the content that was placed in the DVR format folder, and (ii) the computer on which the content is stored. For example, if the Internet Protocol (IP) address associated with personal computer 104 is "192.168.0.1," and if the filename and directory path associated with the content is "/TiVo/CDS/content.mpg," then personal content delivery application may generate an instruction containing a URL that indicates the device, path, and file "192.168.0.1/TiVo/CDS/content.mpg."

In block 306, the instruction is sent over a LAN toward the DVR discussed above. For example, personal content delivery application 114 may send the instruction over LAN 106 toward DVR 102. The instruction is designed to cause DVR 102 to request the URL-specified content from personal computer 104. Control passes back to block 302, in which content that has been subsequently placed in the native format folder may be detected.

In one embodiment of the invention, DVR 102 listens for and receives instructions of this kind from both content delivery service endpoint 110 and from personal content delivery application 114. Each instruction identifies, via a URL, content (e.g., metadata describing the characteristics of the content, such as title, category, whether a user specifically requested the content or whether a DVR or service requested the content, etc.), and a source from which that content may be obtained. In response to receiving such instructions, DVR 102 places the instructions in queue 122 (e.g., at the back of queue 122). One by one, DVR 102 removes the instructions from the front of queue 122. For each such instruction, DVR 102 generates a request, such as an HTTP request, that is destined for the content source (e.g., personal computer 104 or content server 112) identified in that instruction. Each such request identifies the content that is identified in the URL of the corresponding instruction. DVR 102 sends the requests toward the appropriate content sources via LAN 106 and/or Internet 108.

While the technique described above with reference to FIG. 3A is being performed, a technique described below with reference to FIG. 3B may be performed concurrently. Referring now to FIG. 3B, in block 308, a DVR-originated request for the content is received from the LAN. For example, an HTTP server (which may or may not be implemented in personal content delivery application 114)

executing on personal computer 104 may receive, through LAN 106, an HTTP request that DVR 102 sent in response to an instruction as described above. The HTTP request may identify content that is contained in DVR format folder 120, for example.

In block 310, in response to receiving the DVR-originated request, the content specified in the request is sent over the LAN toward the DVR. For example, the HTTP server executing on personal computer 104 may generate an HTTP response that contains the content specified in the DVR-originated request. Typically, the content requested in the HTTP request will be located in DVR format folder 120. The HTTP server may send the HTTP response over LAN 106 toward DVR 102. Control passes back to block 308, in which another DVR-originated request may be detected.

In one embodiment of the invention, DVR 102 listens for and receives HTTP responses from both content server 112 and from personal computer 104. In response to receiving such HTTP responses, DVR 102 stores, on a storage device of DVR 102, such as a hard drive or memory device, the content that is contained in the HTTP responses. DVR 102 may indicate, through a user interface that DVR 102 may display on a television set, that the content is available for viewing or playback at a user's leisure. DVR 102 may play the content on the television set in response to the user's command.

According to one embodiment of the invention, DVR 102 accepts instructions of the type described above only from an "approved" list of personal computers and/or content delivery service endpoints, so that DVR 102 cannot be "spammed" with unwanted content. In one embodiment of the invention, personal content delivery application 114 broadcasts its existence over LAN 106, and DVR 102 receives such a broadcast and responsively adds personal computer 104 to the list of sources from which DVR 102 will accept instructions of the type described above. Since personal content delivery application 114 can only broadcast over a LAN, DVR 102 may be confident that personal computer 104 is connected to LAN 106, and therefore is probably an appropriate source from which to accept instructions that cause DVR 102 to request content. Techniques for secure communication and transportation of information between approved devices are described in U.S. patent application Ser. Nos. 10/220,356, 10/741,596, and 11/285,416, all of which are incorporated by reference herein.

In one embodiment of the invention, DVR 102 is configured in such a manner that a user of DVR 102 can instruct DVR 102 (e.g., using a remote control in conjunction with a user interface) to request, proactively, a list of content that is stored in DVR format folder 120, and to request and download user-selected content that is stored in DVR format folder 120. Additionally or alternatively, DVR 102 may request and download selected content from DVR format folder 120 without the intervention of a user and without receiving any instruction from personal content delivery application 114. For example, DVR 102 may periodically and automatically request and download content that is contained in DVR format folder 120 if that content has not already been downloaded.

According to one embodiment of the invention, personal content delivery application 114 may be used to transfer content, which is stored on a first DVR connected (physically or wirelessly) to LAN 106, to a second DVR that is also connected (physically or wirelessly) to LAN 106. Personal content delivery application 114 may be configured to periodically and automatically determine whether any content that satisfies specified criteria (e.g., is not already stored on the second DVR) is stored on the first DVR. For each such content item, personal content delivery application 114 may instruct the first DVR to send that content item toward personal computer 104. Personal computer 104 may receive such content items from the first DVR and store them in a native format folder that is associated with the second DVR. For each content item in that native format folder, transcoding agent 118 may transcode, into an encoding format that the second DVR can decode, content items that are not already in an encoding format that the second DVR can decode. Transcoding agent may move the content items from the native item folder associated with the second DVR to a DVR format folder associated with the second DVR. Personal content delivery application 114 may send, to the second DVR, instructions which cause the second DVR to request and download, from personal computer 104, content items that are stored in the DVR format folder associated with the second DVR. Additionally or alternatively, instead of being sent to a second DVR, content items and/or such instructions may be sent as described above to a mobile device such as a cell phone, a personal digital assistant (PDA), a portable gaming device, etc. Thus, in one embodiment of the invention, content items that are stored on a DVR are automatically transcoded (potentially at a device other than the DVR) into an encoding format that a mobile device is configured to decode, and then transferred to that mobile device. The content items and/or instructions may be sent using any kind of communication medium, such as the Internet, a LAN, a data link (e.g., serial or USB) from the computer to the mobile device, etc.

In one embodiment of the invention, the content may comprise a video file, an audio (e.g., music) file, an image (e.g., picture) file, or a file that contains both a video/audio/image file and metadata about the video/audio/image file. Thus, in one embodiment of the invention, whenever content is communicated between personal computer 104, DVR 102, and/or other entities, any metadata contained in that content is communicated with the content. Such metadata may comprise information that DVR 102 may display on a television screen in response to a user's request, for example.

According to one embodiment of the invention, content is transmitted over LAN 106 in encrypted form to maintain security. Transcoding agent 118 may decrypt content that has been encrypted with a first form of encryption, transcode the decrypted content into a different encoding format, and then encrypt the content with a second form of encryption. The second form of encryption may differ from the first form of encryption.

Although certain embodiments of the invention have been described above with reference to motion video content (e.g., movies), at least some embodiments of the invention may be used to automatically transcode content of other types, such as audio (e.g., music) content, image (e.g., picture) content, and/or other kinds of content that are encoded according to some encoding format.

4.0 On-Demand Transcoding

According to one embodiment of the invention, content is obtained from a remote source and transcoded "on demand," at the time that a user expresses interest in the content, and not necessarily sooner than that time. For example, personal computer 104 might store a URL that refers to some content that is not yet stored on personal computer 104. For example, personal computer 104 might store a URL that refers to a video file that is stored at content server 112. However, that video file might not yet be stored on personal computer 104. In response to receiving user input, DVR 102 may fetch, from personal computer 104, a list of available content—some of which might not yet reside on personal computer 104. DVR 102 may present the list, including the URL or some title that is associated with the URL, to the user. Using a remote control, the user may select, from the list, a content item in which the viewer is interested. Under such circumstances, DVR 102 would request the selected content from personal computer 104.

In the case that the selected content item corresponds to the URL of the content that is not yet stored on personal computer 104, personal computer 104 may provide, to DVR 102, a local URL (different from the URL of the content on content server 112) that refers to a file on personal computer 104. Personal computer 104 may instruct DVR 102 to obtain and play content that is associated with the local URL. At approximately the same time, personal computer 104 may begin to download the content from content server 112. The content may be transcoded at personal computer 104 as the content is downloaded. The transcoded content may be stored in the file to which the local URL refers. As the transcoded content is being stored in this file, DVR 102 may obtain the transcoded content from the file in the form of stream. DVR 102 may play the streaming content to the user as DVR 102 is obtaining the content, or DVR 102 may store the content for later viewing.

In one embodiment of the invention, a service agent resides on personal computer 104. The service agent maintains a cache of already transcoded content. The service agent may receive, from a web browser or from an application executing on DVR 102, a request for content which might or might not already have been transcoded and stored in the cache. In response to receiving such a request, the service agent determines whether the requested content already has been transcoded and stored in the cache. If the service agent determines that the requested content already has been transcoded and stored in the cache, then the service agent instructs DVR 102 to commence downloading the transcoded content from the cache. Alternatively, if the service agent determines that the requested content has not yet been transcoded and stored in the cache, then the service agent transcodes the content, stores the transcoded content in the cache, and then instructs DVR 102 to commence downloading the transcoded content. As a result, a given content item does not need to be transcoded more than once, even if multiple requests for the same content item (e.g., from different DVRs) are received.

In one embodiment of the invention, if requested content is not stored on personal computer 104, then the service agent begins to download and transcode the requested content from the remote source at which the requested content is stored (e.g., content server 112). As the service agent downloads and transcodes the content, the service agent may store the transcoded content into the cache and/or send the transcoded content to DVR 102 in the form of a stream that DVR 102 can play as DVR 102 receives the stream (i.e., even before the whole content item has been received).

In one embodiment of the invention, web pages that are stored at content server 112, and which are accessible through a web browser that executed on personal computer 104, contain embedded custom tags. The owners or operators of content server 112 may agree to place the custom tags in the web pages as part of a negotiated deal with the distributor of DVR 102, for example. When a user directed the web browser to a web page that contains such a custom tag, the browser's receipt of the custom tag triggers the web browser to begin executing a browser plug-in applet. Through a transaction with content server 112, the browser plug-in applet obtains a URL that refers to content to which the web page pertains. The URL might be obfuscated so that only the browser plug-in applet can obtain the URL. The browser plug-in applet may then download the content at the URL from content server 112 and store the downloaded content into native format folder 116, after which the content may be transcoded and used as described above.

Alternatively, the browser plug-in applet may simply store the URL on personal computer 104 without downloading the content at that time. The URL may be stored such that when DVR 102 queries personal computer 104 for available content, the URL is included in the list of available content (even though the content is not yet stored at personal computer 104). At a later time, a service agent on personal computer 104 may download and transcode the content to which the URL refers "on demand," using the "on-demand" techniques described above.

5.0 Example DVR

Figure 5:
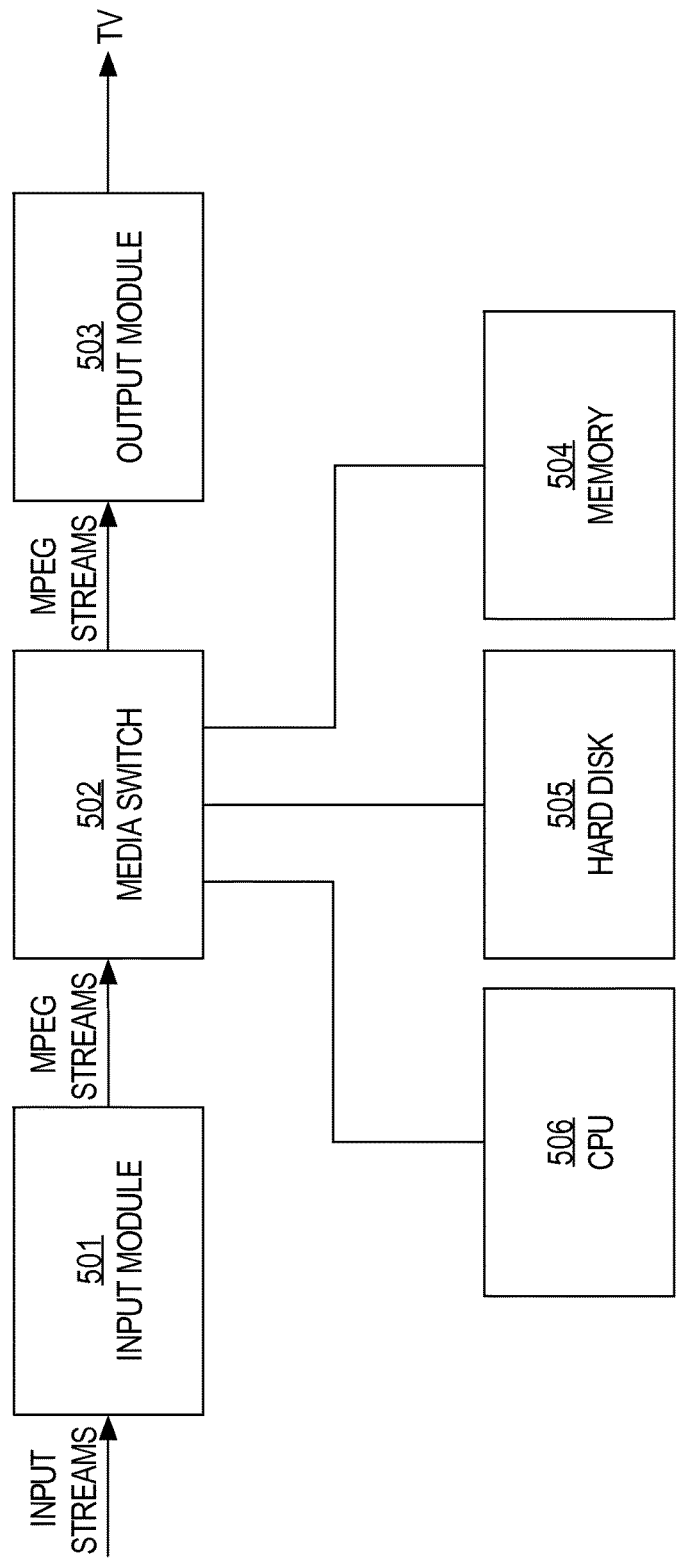
FIG. 5 is a block diagram that shows an example of the internal structure and operation of a DVR, according to an embodiment of the invention.

FIG. 5 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 5 comprises an input module 501, a media switch 502, and an output module 503. Input module 501 receives television (TV) input streams in any of a variety of forms. For example, a TV input stream received by input module 501 may take the form of a National Television Standards Committee (NTSC) compliant signal or a PAL compliant broadcast signal. For another example, a TV input stream received by input module 501 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 501 produces MPEG streams. According to another embodiment of the invention, input module 501 produces streams that are encoded using a different codec.

An MPEG-2 transport multiplex supports multiple programs in the same broadcast channel, which multiple video and audio feeds and private data. Input module 501 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 501 and passed to the other modules as if the signals had been delivered via an MPEG-2 private data channel.

Media switch 502 mediates between a microprocessor CPU 506, a hard disk or storage device 505, and memory 504. Input streams are converted to an MPEG stream and sent to media switch 502. Media switch 502 buffers the MPEG stream into memory 504. Media switch 502 then performs two operations if the DVR user is watching real-time TV: media switch 502 sends the MPEG stream to output module 503 and simultaneously writes the MPEG stream to hard disk or storage device 505.

Output module 503 receives MPEG streams as input and produces an analog TV signal according to NTSC, PAL, or other TV standards. Output module 503 comprises an MPEG decoder, an on-screen display (OSD) generator, an analog TV encoder, and audio logic. The OSD generator allows the program logic to supply images which may be overlaid on top of the resulting TV analog signal. Additionally, output module 503 can modulate information supplied by the program logic onto the VBI of the output signal in a number of standard formats, including NABTS, CC, and EDS.

6.0 Hardware Overview

Figure 4:
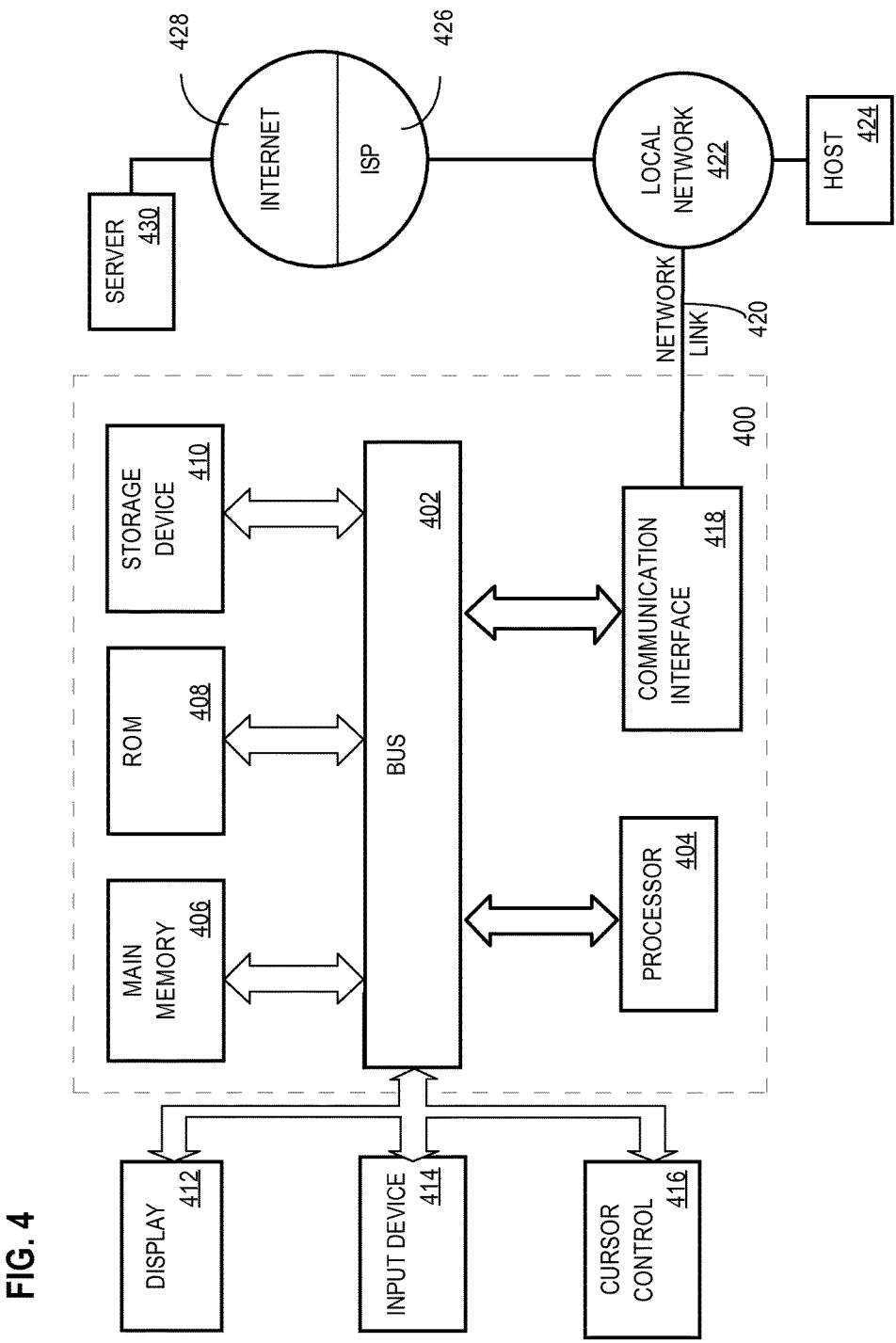
FIG. 4 is a block diagram of a system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP)

426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for making content available to a multimedia device on demand, the method comprising:
   downloading, at a first device, a content item from a site that is remote from the first device, wherein the content item is encoded in a first encoding format that the multimedia device is not configured to decode and wherein the content item comprises a first portion and a second portion;
   concurrently with the first device downloading the content item:
      automatically transcoding, at the first device, upon receiving the first portion of the content item, the first portion into a second encoding format which the multimedia device is configured to decode;
      transmitting, subsequent to the first device automatically transcoding the first portion of the content item and prior to the first device transcoding the second portion of the content item, a notification from the first device to the multimedia device wherein the notification informs the multimedia device that the content item in the second encoding format is available for the multimedia device to access; and
      receiving, at the first device, a request for the content item from the multimedia device; and
      transmitting, in response to receiving the request, the transcoded first portion of the content item from the first device to the multimedia device, wherein the first device transmits the first portion to the multimedia device simultaneously with downloading, at the first device, the second portion of the content item from the site and transcoding, at the first device, the second portion of the content item from the first encoding format to the second encoding format.

2. A method as recited in claim 1, wherein said content item is specified in the request by the multimedia device.

3. A method as recited in claim 1, wherein said content item is specified via a web page that is provided by a service that communicates with said first device.

4. A method as recited in claim 1, further comprising:
   storing a transcoded version of the content item in a cache at the first device;
   in response to receiving the request for the content item, determining whether the content item is stored in the cache; and
   in response to determining that the content item is stored in the cache, sending the content item from the cache to the multimedia device.

5. A non-transitory computer-readable storage medium carrying instructions which, when executed by one or more processors, instruct the one or more processors to perform steps comprising:
   downloading, at a first device, a content item from a site that is remote from the first device, wherein the content item is encoded in a first encoding format that the multimedia device is not configured to decode and wherein the content item comprises a first portion and a second portion;
   concurrently with the first device downloading the content item:
      automatically transcoding, at the first device, upon receiving the first portion of the content item, the first portion into a second encoding format which the multimedia device is configured to decode;
      transmitting, subsequent to the first device automatically transcoding the first portion of the content item and prior to the first device transcoding the second portion of the content item, a notification from the first device to the multimedia device wherein the notification informs the multimedia device that the content item in the second encoding format is available for the multimedia device to access;
   receiving, at the first device, a request for the content item from the multimedia device; and
   transmitting, in response to receiving the request, the transcoded first portion of the content item from the first device to the multimedia device, wherein the first device transmits the first portion to the multimedia device simultaneously with downloading, at the first device, the second portion of the content item from the site and transcoding, at the first device, the second portion of the content item from the first encoding format to the second encoding format.

6. A non-transitory computer-readable storage medium as recited in claim 5, wherein said content item is specified in the request by the multimedia device.

7. A non-transitory computer-readable storage medium as recited in claim 5, wherein said content item is specified via a web page that is provided by a service that communicates with said first device.

8. The non-transitory computer-readable medium of claim 5, wherein the instructions further comprise:
   storing a transcoded version of the content item in a cache at the first device;
   in response to the request for the content item, determining whether the content item is stored in the cache; and in response to determining that the content item is stored in the cache, sending the content item from the cache to the multimedia device.

9. A computer-implemented method for transcoding content, the method comprising:
in response to receiving a specified type of tag in a web page by a browser at a first device, performing:
the browser executing, at the first device, a browser plug-in that is used to obtain from a site a URL that refers to content that is stored at the site, the URL being obfuscated so that only the browser plug-in is allowed to obtain the URL from the site;
the browser plug-in, as executed by the browser, performing a transaction that obtains, from the site, the URL that refers to the content that is stored at the site, the URL being obtained after the browser plug-in executes a transaction with the site;
downloading, to the first device, the content to which the URL refers;
transcoding, at the first device, the content to which the URL refers from a first encoding format which a multimedia device is not configured to decode to a second encoding format which the multimedia device is configured decode.

10. A method as recited in claim 9, further comprising:
after transcoding the content to which the URL refers, transferring the transcoded content from the first device to the multimedia device.

11. A method as recited in claim 9, wherein the steps of downloading and transcoding are performed in response to the first device's receipt, from the multimedia device, of the request for the content, and wherein the request for the content is made by the multimedia device after the first device sends an instruction informing that the content is available for the multimedia device to request.

12. A non-transitory computer-readable storage medium carrying instructions which, when executed by one or more processors, instruct the one or more processors to perform steps comprising:
in response to receiving a specified type of tag in a web page by a browser at a first device, performing:
the browser executing, at the first device, a browser plug-in that is used to obtain from a site a URL that refers to content that is stored at the site, the URL being obfuscated so that only the browser plug-in is allowed to obtain the URL from the site;
the browser plug-in, as executed by the browser, performing a transaction that obtains, from the site, the URL that refers to the content that is stored at the site, the URL being obtained after the browser plug-in executes a transaction with the site;
downloading, to the first device, the content to which the URL refers;
transcoding, at the first device, the content to which the URL refers from a first encoding format which a multimedia device is not configured to decode to a second encoding format which the multimedia device is configured decode.

13. A non-transitory computer-readable medium as recited in claim 12, wherein the steps further comprise:
after transcoding the content to which the URL refers, transferring the transcoded content from the first device to the multimedia device.

14. The non-transitory computer-readable medium of claim 12, wherein the steps of downloading and transcoding are performed in response to the first device's receipt, from the multimedia device, of the request for the content, and wherein the request for the content is made by the multimedia device after the first device sends an instruction informing that the content is available for the multimedia device to request.

* * * * *